United States Patent
Shibata et al.

(10) Patent No.: US 7,606,493 B2
(45) Date of Patent: Oct. 20, 2009

(54) OPTICAL WAVEGUIDE AND OPTICAL MULTIPLEXER-DEMULTIPLEXER

(75) Inventors: Tomoaki Shibata, Tsukuba (JP); Hiroshi Masuda, Tsukuba (JP); Yasushi Sugimoto, Tsukuba (JP); Tetsuya Hoshino, Tsukuba (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/949,657

(22) Filed: Sep. 27, 2004

(65) Prior Publication Data

US 2005/0041918 A1    Feb. 24, 2005

Related U.S. Application Data

(63) Continuation of application No. PCT/JP03/03820, filed on Mar. 27, 2003.

(30) Foreign Application Priority Data

Mar. 28, 2002 (JP) ............................. 2002-091783
Oct. 8, 2002 (JP) ............................. 2002-295375

(51) Int. Cl.
*H04J 14/02* (2006.01)
(52) U.S. Cl. ........................................ 398/81
(58) Field of Classification Search ................. None
See application file for complete search history.

(56) References Cited

U.S. PATENT DOCUMENTS 4,634,215 A * 1/1987 Reule ........................... 385/43

(Continued)

FOREIGN PATENT DOCUMENTS

JP    63-244003 A    10/1988

(Continued)

OTHER PUBLICATIONS

Watanabe et al, Polymeric Optical Waveguide Circuits Formed Using Silicone Resin, Jun. 6, 1998. Journal of Lightwave Technology vol. 16, No. 6 pp. 1049-1055.*

(Continued)

*Primary Examiner*—Shi K Li

(57) ABSTRACT

The present invention provides an optical waveguide which comprises a core 4 for incident light and a core 5 for outgoing light, wherein the width of the core 5 for outgoing light is more than 1.5 times that of the core 4 for incident light. This optical waveguide permits the multiplexing and/or demultiplexing of light rays even when the wavelengths thereof undergo changes within the range of about 10 nm. In addition, the present invention further provides an optical multiplexer-demultiplexer which comprises the combination of an optical waveguide serving as an optical path and a diffraction grating for demultiplexing and focusing light, wherein the absolute value of the difference between the refractive index (nTE) of the core layer of the optical waveguide in the direction parallel to the plane of the film and that (nTM) of the core layer thereof in the direction perpendicular to the plane of the film is not more than 0.007 at the wavelength used. This optical multiplexer-demultiplexer permits the control of the wavelength fluctuation observed for the outputted signal light dependent on the polarization direction of the incident signal light to not more than 5 nm by the reduction of the birefringence index of the core layer of the optical waveguide to a level of not more than 0.007.

19 Claims, 11 Drawing Sheets

U.S. PATENT DOCUMENTS

| | | | | |
|---|---|---|---|---|
| 5,461,683 | A * | 10/1995 | Harman | 385/21 |
| 6,091,870 | A * | 7/2000 | Eldada | 385/37 |
| 6,205,273 | B1 * | 3/2001 | Chen | 385/37 |
| 6,526,199 | B1 * | 2/2003 | Song et al. | 385/24 |
| 6,633,703 | B2 * | 10/2003 | Katayama | 385/37 |
| 6,839,492 | B2 * | 1/2005 | Kwon et al. | 385/50 |
| 2003/0021539 | A1 * | 1/2003 | Kwon et al. | 385/50 |

FOREIGN PATENT DOCUMENTS

| | | |
|---|---|---|
| JP | 5-313029 A | 11/1993 |
| JP | 9-15608 A | 1/1997 |
| JP | 09-015608 A | 1/1997 |
| JP | 10-90530 A | 4/1998 |
| JP | 10-90537 A | 4/1998 |
| JP | 10-227936 A | 8/1998 |
| JP | 11-052151 A | 2/1999 |
| JP | 11-52151 A | 2/1999 |
| JP | 11-218625 A | 8/1999 |
| JP | 11-218625 A | 8/1999 |
| JP | 2002-341158 A | 11/2002 |

OTHER PUBLICATIONS

Hibino, Yoshinori, "High contrast waveguide devices", Technical Digest of Optical Fiber Conference 2001, WB1-1 (2001), 3 pp.

International Search Report, completed May 2, 2003.

T. Suhara et al, "Integrated-optic waveguide multi-and demultiplexers using a chrped grating and an ion-exchanged waveguide", Applied Optics, vol. 21, No. 12, Jun. 15, 1982, pp. 2195-2198.

Office Action Issued in the Corresponding Japanese Application 2003-580912 on Sep. 18, 2007.

* cited by examiner

CROSS SECTIONAL VIEW TAKEN ALONG THE LINE A-A'

US 7,606,493 B2

OPTICAL WAVEGUIDE AND OPTICAL MULTIPLEXER-DEMULTIPLEXER

This is a continuation application of International Patent Application No. PCT/JP03/03820, filed Mar. 27, 2003, which claims priority on Japanese Patent Application No. 2002-91783, filed Mar. 28, 2002 and Japanese Patent Application No. 2002-295375, filed Oct. 8, 2002. The entire disclosures of the above patent applications are hereby incorporated by reference.

TECHNICAL FIELD

The present invention relates to an optical waveguide and an optical multiplexer-demultiplexer and, in particular, to an optical demultiplexing waveguide which can classify optical signals constituted by those having a plurality of wavelengths into groups each having a single wavelength, an optical multiplexing waveguide which can compose optical signals constituted by those having a plurality of wavelengths and an optical multiplexer-demultiplexer. The present invention likewise relates to an optical multiplexer-demultiplexer used in the wavelength division multiplexing transmission wherein the wavelength range is about several tens of nanometers.

BACKGROUND ART

The requirements for the communication of information have rapidly been increased along with the recent wide spread of the internet. For this reason, there has widely been spread the wavelength division multiplexing (WDM) transmission technique in which signals are transmitted within a single optical fiber through the use of a plurality of light rays having different wavelengths. In case of the long distance communication, there has been used dense wavelength division multiplexing (DWDM) transmission technique which makes use of a large number of light rays having different wavelengths and in which the wavelength range used is reduced to a level of not more than 1 nm to thus carry information on a single optical fiber in a quantity of information as great as possible. In this case, it is essential that the fluctuation in each wavelength should be not more than 0.1 nm and it has been required that the fluctuation is preferably not more than 0.01 nm.

On the other hand, there has been spread, for the communication within the distance ranging from several to several tens of kilometers, the coarse wavelength division multiplexing (CWDM) transmission technique in which the wavelength range used is expanded to a level of not less than 20 nm in order to cope with such a fluctuation in wavelength on the order of about 10 nm. In this case, the use of a temperature control means such as a laser can be omitted and therefore, this may reduce the cost required for communication. There has been required for the use of an optical multiplexer for composing or coupling a plurality of optical signals having different wavelengths and a demultiplexer for classifying such signals into groups each having a single wavelength in order to realize such WDM transmission.

As an optical multiplexer-demultiplexer for the DWDM transmission, there has been known, for instance, one which makes use of an array diffraction grating (AWG) as disclosed in Technical Digest of Optical Fiber Conference 2001, WB1-1 (2001), but this optical multiplexer-demultiplexer can cope only with narrow wavelength fluctuations of not more than 0.1 nm and it cannot perform any optical multiplexing or coupling and demultiplexing operations when the wavelength fluctuation is on the order of 10 nm like the CWDM transmission.

As an optical multiplexer-demultiplexer which can cope with a wide wavelength fluctuation like one for the CWDM transmission, there has been reported, for instance, an optical multiplexer-demultiplexer which makes use of an optical waveguide and a diffraction grating such as that disclosed in Applied Optics, 1982, 21: 2195. This optical multiplexer-demultiplexer comprising the combination of these two components permits the reduction of the number of parts to be used and the miniaturization of this device.

Moreover, as a method for realizing the CWDM transmission, there has been known, for instance, one which comprises the step of demultiplexing light rays using a plurality of multilayered thin film filters, each of which can pass light rays of a desired wavelength therethrough, in the number corresponding to that of the wavelengths of these light rays. The optical demultiplexer used in this method comprises a wavelength filter consisting of about 100 thin layers, whose thickness is highly precisely controlled, a collimating lens and a fiber which are assembled in such a manner that the optical axes thereof are in good agreement with one another.

The conventional optical multiplexer-demultiplexer which makes use of an AWG can simply cope with the narrow wavelength fluctuation of not more than 0.1 nm and therefore, it cannot perform any optical multiplexing or coupling and demultiplexing operation when the wavelength fluctuation is on the order of 10 nm like the CWDM transmission. The optical multiplexer-demultiplexer for the CWDM transmission should satisfy the requirement for morphological characteristics such as the flat top-shaped characteristics as shown in the attached FIG. 9, in which the transmission loss does not vary even for the wavelength fluctuation of about 10 nm. However, the conventional optical multiplexer-demultiplexer which made use of a diffraction grating showed cone-shaped characteristics as disclosed in the foregoing article: Applied Optics, 1982, 21: 2195, in which the transmission loss increased in proportion to the wavelength fluctuation. Moreover, in a multiplexing and demultiplexing method using a multilayered thin film filter, it is necessary to use a plurality of multilayered thin film filters, which are quite expensive and whose mass-production is quite difficult, in proportion to the number of wavelengths and it is also needed to highly precisely position the same with respect to a precise lens and/or an optical fiber. Thus, the resulting device is quite expensive. In addition, a problem arises such that the productivity thereof is likewise low and accordingly, the mass production thereof is quite difficult.

In the structure of an optical multiplexer-demultiplexer which makes use of an optical waveguide and a diffraction grating, if the optical waveguide used has a large absolute value (hereunder referred to as "birefringence index") of the difference between the refractive index (nTE) of the core layer of the optical waveguide in the direction parallel to the plane of the film and that (nTM) of the core layer thereof in the direction perpendicular to the plane of the film, a problem arises such that the wavelength of the outputted (or outgoing) signal light varies depending on the polarization direction of the inputted signal light. As has been described above, the optical multiplexer-demultiplexer for the CWDM transmission should perform multiplexing and demultiplexing operations even when the wavelength fluctuation in the outputted signal light is at least 10 nm. The wavelength fluctuation in the light oscillated from a laser as a light source may be at least 5 nm due to the dispersion of the laser produced and the temperature change in the environment in which the laser is used and therefore, the wavelength fluctuation due to the birefringence index should be not more than 5 nm.

If the variation in wavelength, the wavelength used, the refractive index at the wavelength used and the birefringence index at the wavelength used are defined to be Δλ(nm), λ(nm), n and Δn, respectively, the relation between the birefringence index and the wavelength fluctuation is in general expressed by the following equation:

$$\Delta\lambda = \lambda \times \Delta n / n \qquad (1)$$

For instance, when forming a film of a fluorinated polyimide used as a material for optical waveguides on a silicon substrate, the refractive index n of the film is found to be 1.5291 and the birefringence index Δn thereof is found to be 0.009 at a wavelength used of 1300 nm. From the foregoing, the wavelength fluctuation Δλ is found to fall within the range of from about 7 to 8 nm and this becomes a serious obstacle in practical applications.

DISCLOSURE OF THE INVENTION

Accordingly, it is an object of the present invention to provide an optical waveguide structure which permits the multiplexing and demultiplexing of light rays even when the wavelengths of light rays may widely vary in the order of about 10 nm.

It is another object of the present invention to provide an optical multiplexer-demultiplexer which shows only a small wavelength fluctuation in the outputted signal light.

According to the present invention, there are provided the following optical waveguides and optical multiplexer-demultiplexers:

(1) An optical waveguide which comprises a core 4 for incident light and a core 5 for outgoing light, wherein the width of the core 5 for outgoing light is more than 1.5 times that of the core 4 for incident light.

(2) The foregoing optical waveguide wherein the width of the core 5 for outgoing light is 2 to 20 times that of the core 4 for incident light.

(3) The foregoing optical waveguide wherein the width of the core 4 for incident light ranges from 3 to 10 μm and that of the core 5 for outgoing light ranges from 15 to 50 μm.

(4) The foregoing optical waveguide wherein the light propagated through the core 4 for incident light is single mode one.

(5) The foregoing optical waveguide wherein it further comprises at least one core for alignment.

(6) An optical multiplexer-demultiplexer which makes use of the foregoing optical waveguide.

(7) The foregoing optical multiplexer-demultiplexer which is equipped with a diffraction grating.

(8) The foregoing optical multiplexer-demultiplexer in which the diffraction grating is provided with a reflection coat.

(9) The optical multiplexer-demultiplexer as set forth in any one of the foregoing items 6 to 8, wherein the absolute value of the difference between the refractive index (nTE) of the core layer of the optical waveguide in the direction parallel to the plane of the film and that (nTM) of the core layer thereof in the direction perpendicular to the plane of the film is not more than 0.007 at the wavelength used.

(10) An optical multiplexer-demultiplexer which makes use of an optical waveguide serving as an optical path and a diffraction grating for demultiplexing and focusing light, wherein the absolute value of the difference between the refractive index (nTE) of the core layer of the optical waveguide in the direction parallel to the plane of the film and that (nTM) of the core layer thereof in the direction perpendicular to the plane of the film is not more than 0.007 at the wavelength used.

(11) The optical multiplexer-demultiplexer as set forth in any one of the foregoing items 6 to 10, wherein the optical waveguide and a substrate supporting the waveguide are made of resins.

BEST MODE FOR CARRYING OUT THE INVENTION

According to a first embodiment of the present invention, there is provided an optical waveguide detailed below.

More specifically, the invention provides an optical waveguide which comprises a core 4 for incident light and a core 5 for outputted or outgoing light, wherein the width of the core 5 for outgoing light is more than 1.5 times, preferably 2 to 20 times, more preferably 2 to 10 times and most preferably 3 to 8 times that of the core 4 for incident light.

In addition, the width of the core 4 for incident light preferably ranges from 3 to 10 μm and that of the core for outgoing light preferably ranges from 15 to 50 μm. For instance, it is preferred that the light incident upon the core 5 for outgoing light has a small spot shape in order to impart such flat top-shaped optical demultiplexing characteristics as those shown in FIG. 9 to an optical multiplexer-demultiplexer and, to this end, the optical waveguide used is preferably so designed that the light propagating through the core 4 for incident light is in a single mode.

The term "the width of the core" herein used means the width of each core when a plurality of cores are used.

Figure 9:
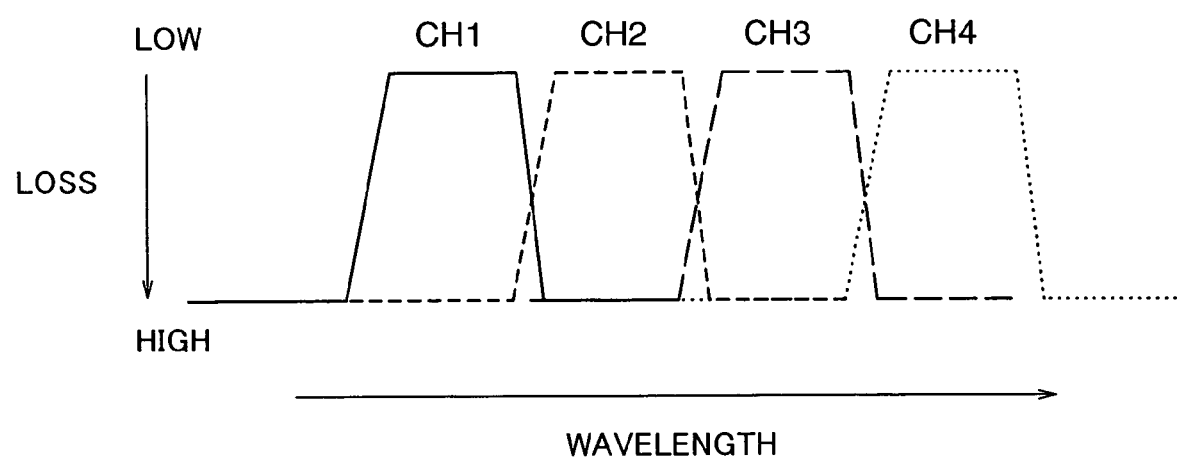
FIG. 9 is a diagram showing the optical demultiplexing characteristics observed for a multiplexer-demultiplexer for the CWDM transmission.

If the width of the core 5 for outgoing light is not more than 1.5 times that of the core 4 for incident light, the resulting optical waveguide shows such a flat transmission loss as that shown in FIG. 9 only for a narrow wavelength fluctuation and cannot cope with the fluctuation over a wide wavelength range required for the CWDM transmission. If the width of the core 5 for outgoing light is greater than 20 times that of the core 4 for incident light, a problem may arise such that the resulting optical waveguide correspondingly increases in its size. For instance, the core diameter of the optical fiber used and the light-receiving area of a light-receiving device, upon which the outputted light is incident, are increased in proportion to the large width of the core and as a result, the propagation speed of the light is limited and therefore, it may be unacceptable in the high speed transmission.

In the optical waveguide of the present invention, the width of the core 5 for outgoing light is larger than that of the core 4 for incident light and therefore, it is difficult to accurately position the optical waveguide with respect to parts such as an optical fiber and/or a diffraction grating, while monitoring the intensity of the light outputted from the core 5 for outgoing light. Thus, it is desirable to provide at least one core for alignment in addition to the foregoing cores and to carry out the alignment of the part upon which the incident light strikes such as the foregoing diffraction grating, while making use of the core for alignment.

The optical waveguide according to the present invention comprises a plurality of cores 4 for incident light; a plurality of cores 5 for outgoing light each having a width greater than that of the core 4; a diffraction grating 7 or an array optical waveguide-diffraction grating 10, having unevenness or a refractive index distribution and accordingly, the optical waveguide can be used in an optical multiplexer-demultiplexer which can cope even with the wide wavelength fluctuation in the order of 10 nm.

Alternatively, the optical waveguide of the present invention may be so designed that it comprise a plurality of cores 4 for incident light and a single core 5 for outgoing light and the resulting waveguide can be used in an optical multiplexer-demultiplexer whose surface area is reduced. Moreover, the optical waveguide of the present invention may likewise be so designed that it comprise a single core 4 for incident light and a plurality of cores 5 for outgoing light and the resulting waveguide can be used in an optical multiplexer-demultiplexer whose surface area is reduced. A single mode optical fiber is used in the long distance transmission or communication exceeding the distance of 1 km. In this case, the optical multiplexer-demultiplexer of the present invention cannot suitably be used since the optical fiber would undergo a significant transmission loss when it is connected to the optical multiplexer-demultiplexer. In this case, it is preferred that the optical waveguide of the present invention is preferably used in an optical demultiplexing device.

The transmission type and reflector type diffraction gratings may be used in the invention as those having unevenness or projections on the surface and used for forming an optical multiplexer-demultiplexer and the reflector type diffraction grating usable herein may be one coated with a reflection coat of, for instance, a metal for the improvement of the reflectance thereof. Moreover, in a multiplexer-demultiplexer having such a structure, it is necessary to accurately align the diffraction grating with respect to the optical waveguide. To this end, the foregoing cores for alignment are incorporated into the device. Accordingly, the position of the diffraction grating can be optimized in such a manner that the intensity of the light outputted through the core for alignment is maximized when the diffracted light from the diffraction grating is incident upon the core for alignment. The optical multiplexer-demultiplexer thus completed shows flat top-shaped wavelength characteristics as shown in FIG. 9. The transmission loss of light within the optical multiplexer-demultiplexer (the rate of the reduction in the power of the outputted light with respect to the incident light) does not depend on the wavelength within the wavelength range on the order of 10 nm and the device may have characteristic properties whose tolerance is quite wide with respect to the wavelength fluctuation due to, for instance, the temperature change of a laser used.

In the optical multiplexer-demultiplexer which makes use of the foregoing optical waveguide, it is desirable that the absolute value of the difference between the refractive index (nTE) of the core layer of the optical waveguide in the direction parallel to the plane of the film and that (nTM) of the core layer thereof in the direction perpendicular to the plane of the film is not more than 0.007 at the wavelength used.

According to a second embodiment of the present invention, there is provided an optical multiplexer-demultiplexer which makes use of an optical waveguide serving as an optical path and a diffraction grating for demultiplexing and focusing light, wherein the absolute value of the difference between the refractive index (nTE) of the core layer of the optical waveguide in the direction parallel to the plane of the film and that (nTM) of the core layer thereof in the direction perpendicular to the plane of the film is not more than 0.007 at the wavelength used.

If the birefringence index of the core layer of an optical waveguide serving as an optical path is adjusted to a level of not more than 0.007, the wavelength fluctuation in the outputted signal light, which is dependent on the polarization direction of the incident signal light, can be restricted to a level of not more than 5 nm. The foregoing value is a birefringence index $\Delta n$ as determined according to the foregoing equation (1) while the wavelength $\lambda$ used and the refractive index n are assumed to be 1270 to 1610 nm and 1.4 to 1.7, respectively such that the wavelength fluctuation $\Delta\lambda$ is not more than 5 nm.

Principal causes for the occurrence of such a birefringence index are the intrinsic birefringence index of the material in itself and the residual stress generated during the process for the production of the core layer of an optical waveguide. The present invention intends to solve the foregoing problems by the reduction of these intrinsic birefringence index and residual stress.

Examples of such materials each having a small intrinsic birefringence index are acrylic resins, epoxy resins, silicone resins, $SiO_2$ or $SiO_2$ doped with at least one additive selected from, for instance, Ge, Ti and F for the control of the refractive index thereof. In particular, it has been known that acrylic resins and $SiO_2$ or $SiO_2$ doped with at least one additive selected from, for instance, Ge, Ti and F for the control of the refractive index have an intrinsic birefringence index of not more than 0.001 and therefore, they are preferably used in a core layer of an optical waveguide.

On the other hand, as a means for reducing the residual stress of a core layer of an optical waveguide, there has been known one which comprises the step of reducing the difference in the thermal expansion coefficient between the optical waveguide including the core layer (light-guiding core layer) and a substrate therefor. A ratio of the thermal expansion coefficient of the optical waveguide including the core layer (light-guiding core layer) to that of a substrate therefor is preferably not more than 30 times, more preferably not more than 20 times and most preferably not more than 10 times.

When preparing an optical waveguide comprising a light-guiding core layer using, for instance, a fluorinated polyimide, the optical waveguide has conventionally been formed on a substrate such as a silicon or quartz substrate. In this case, a ratio of the thermal expansion coefficient of the optical waveguide to that of the substrate is not less than 10 and therefore, a residual stress is generated in the polyimide film after the film-formation. This stress accordingly leads to the generation of a large birefringence index. To solve the problem, the thermal expansion coefficient of the optical waveguide is brought close to that of the substrate or when the optical waveguide is made of a polymer, it is effective to obtain a substrate for supporting the polymeric waveguide from a resin whose thermal expansion coefficient is very close to that of the polymer used for the production of the optical waveguide.

As a specific example, when using a fluorinated polyimide resin as a material for the light-guiding core layer, it is sufficient to use a substrate made of a polyimide resin. Thus, the birefringence index of the resulting light-guiding core layer can be reduced to a level of less than 0.001.

The diffraction grating used in the optical multiplexer-demultiplexer according to the present invention is not restricted to any specific one, but specific examples thereof usable herein are reflector type diffraction gratings such as those provided with a metal coat of, for instance, Al and Au on the surface thereof as a reflection coat and transmission type diffraction gratings such as those obtained using, as base materials therefor, materials capable of transmitting light therethrough such as quartz and transparent plastic materials.

In the foregoing first and second embodiments, there has been described, by way of example, an optical multiplexer-demultiplexer having such a structure that a diffraction grating is provided independent of the optical waveguide substrate, but the present invention is not restricted to these specific embodiments at all and a diffraction grating and an optical waveguide can be integrated or united. In such an embodiment, the alignment of elemental diffraction grating and optical waveguide can be omitted upon the packaging of the device and this accordingly permits the simplification of the steps for the production of the optical multiplexer-demultiplexer and the significant reduction of the production cost.

The present invention will hereunder be described in more detail with reference to the following Examples.

EXAMPLE 1

Figure 1:
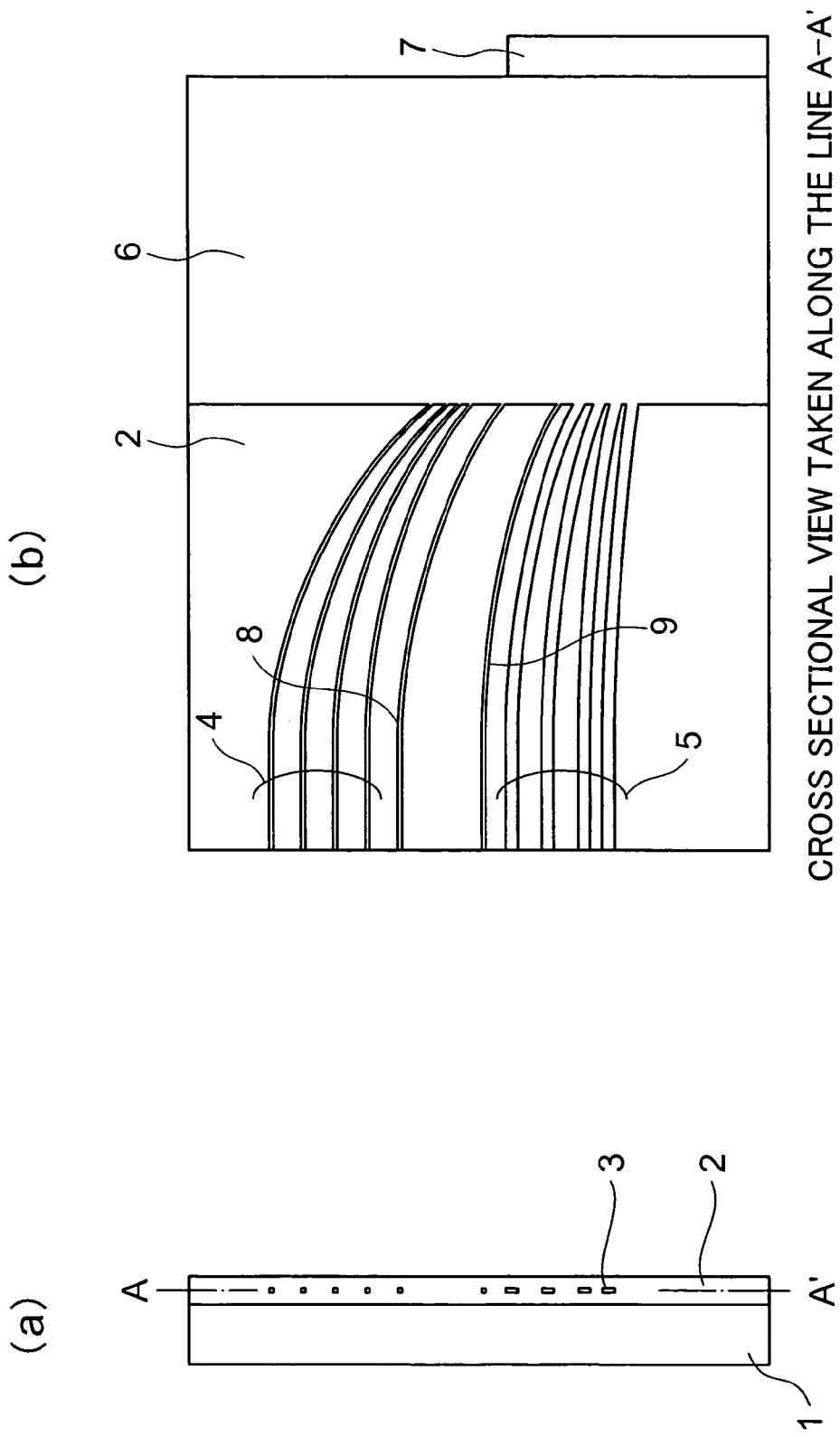
FIG. 1(*a*) is a schematic side view of an optical multiplexer-demultiplexer described in Example 1 according to the present invention and FIG. 1(*b*) is a cross sectional view thereof taken along the line A-A' in FIG. 1(*a*).

The optical waveguide according to a first embodiment of the present invention will hereunder be described with reference to FIG. 1. In this respect, FIG. 1(*a*) is a side view of an optical waveguide according to the present invention and FIG. 1(*b*) is a cross sectional view thereof taken along the line A-A' in FIG. 1(*a*). A core 3 having a rectangular cross section is embedded in a claddingding 2 positioned on a substrate 1; the core 3 has a pattern comprising four cores 4 for incident light (incident cores), four cores 5 for outgoing light (outgoing cores), an incident core 8 and an outgoing core 9 for alignment and a slab-like core 6; and a diffraction grating 7 is arranged at the right edge of the optical waveguide. In this connection, materials for preparing the substrate used herein may, for instance, be a glass, a semiconductor (Si or the like) or a polymeric resin. On the other hand, those for preparing the cladding 2 and the core 3 may be, for instance, $SiO_2$, or $SiO_2$ which comprises at least one additive for controlling the refractive index of these cladding and core such as Ge, Ti and F, or a polymeric material such as a fluorinated polyimide, a silicone resin or an epoxy resin whose refractive index is adjusted. The diffraction grating 7 is provided, on the surface, with irregularity having a desired period and a metal such as Au or Al is coated on the surface thereof, which comes in contact with the optical waveguide, in order to reflect light rays.

Figure 2:
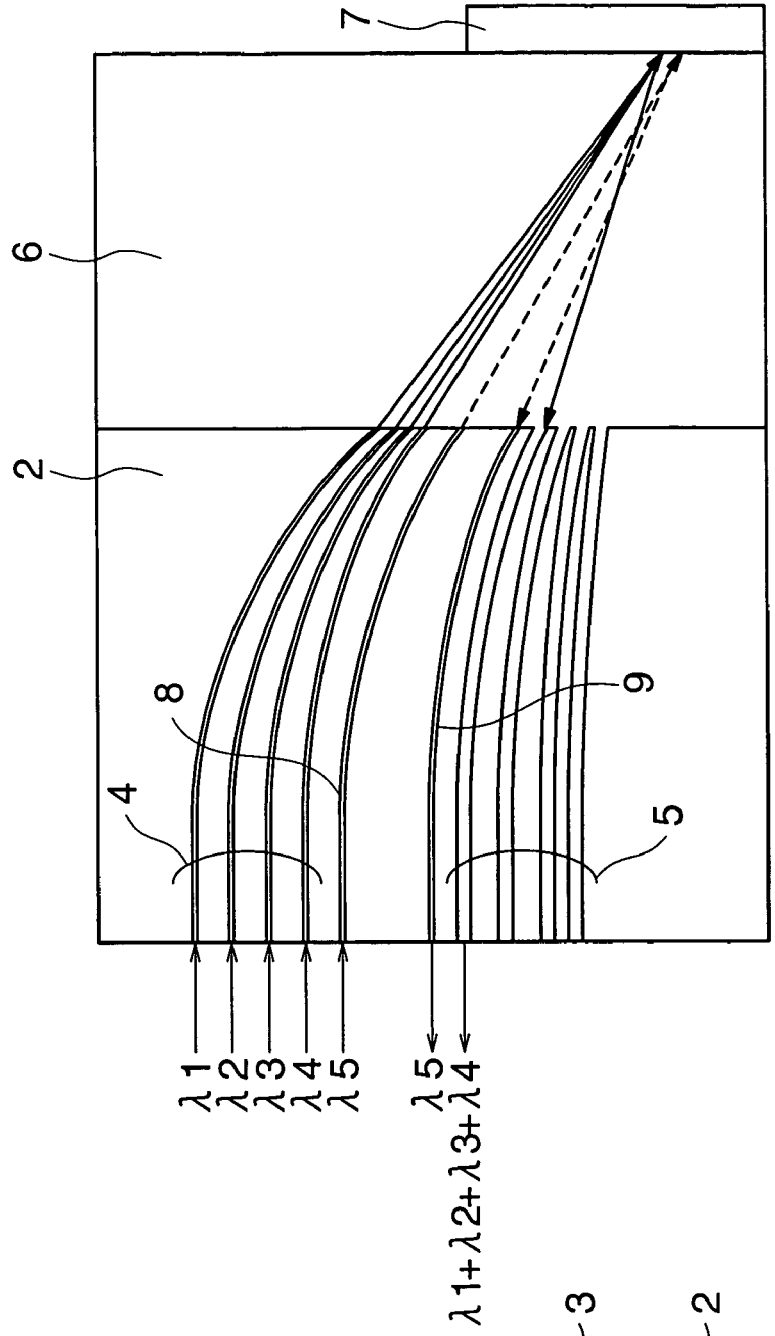
FIG. 2(*a*) is a schematic side view of an optical multiplexer-demultiplexer described in Example 1 according to the present invention and FIG. 2(*b*) is a cross sectional view thereof taken along the line A-A' in FIG. 2(*a*).

When using the optical multiplexer-demultiplexer as an optical multiplexer, four kinds of light rays having wavelengths of $\lambda 1$, $\lambda 2$, $\lambda 3$ and $\lambda 4$ are incident upon four incident cores 4 respectively as shown in FIG. 2. The incident light rays propagate through the incident cores 4 and the slab-like core 6, strike on the diffraction grating 7 and each light ray is reflected by the same at an angle specified by the wavelength thereof. In this respect, if the diffraction grating 7 is so designed that the light rays having wavelengths of $\lambda 1$, $\lambda 2$, $\lambda 3$ and $\lambda 4$ are incident upon a predetermined single outgoing core 5, the resulting optical multiplexer-demultiplexer can operate as an optical multiplexer and as a result, the four kinds of light rays reflected by the diffraction grating 7 are externally outputted through the single outgoing core 5.

Figure 3:
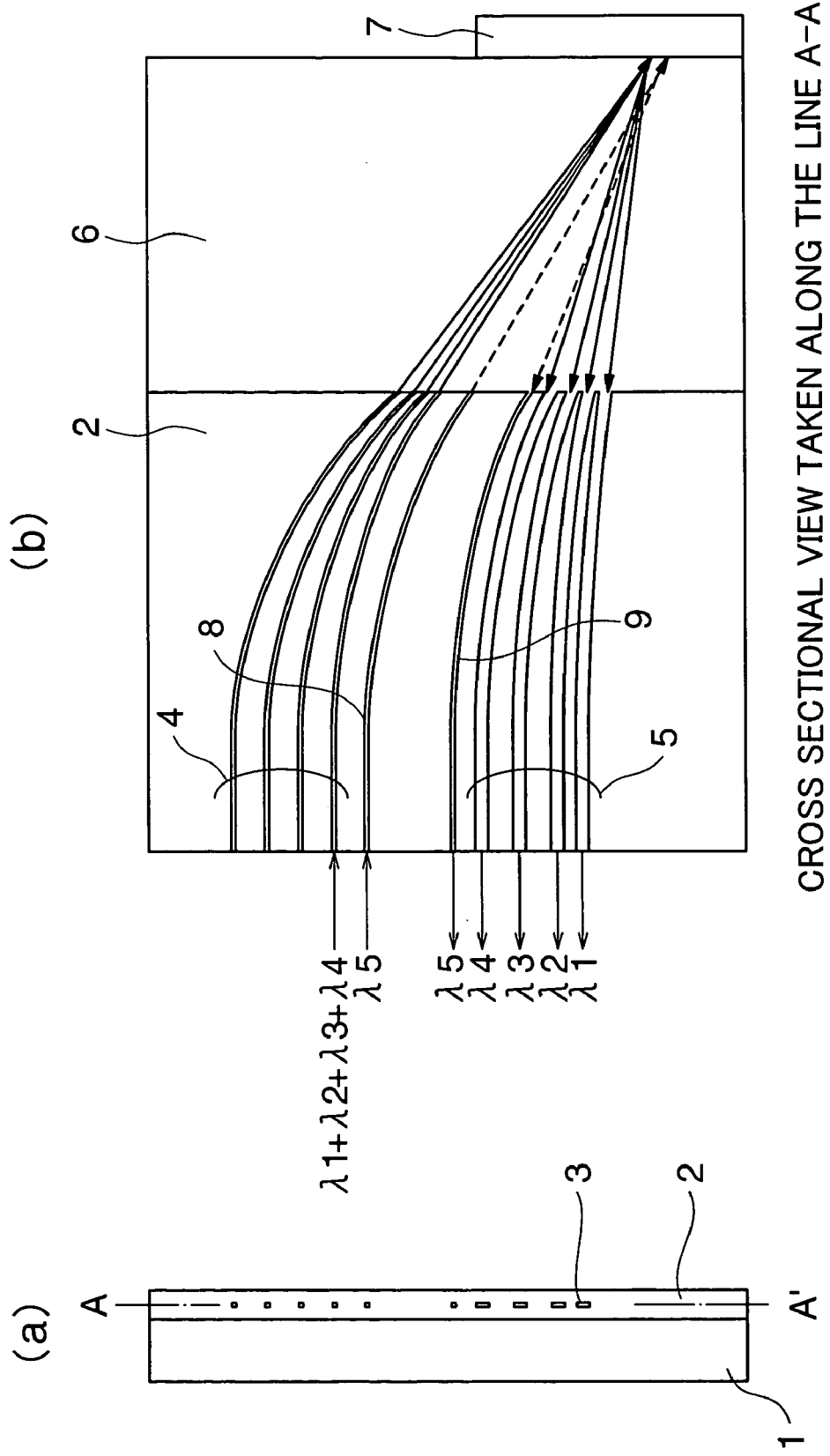
FIG. 3(*a*) is a schematic side view of an optical multiplexer-demultiplexer described in Example 1 according to the present invention and FIG. 3(*b*) is a cross sectional view thereof taken along the line A-A' in FIG. 3(*a*).

Alternatively, when using the optical multiplexer-demultiplexer as an optical demultiplexer, wavelength-multiplexed four optical signals having wavelengths of $\lambda 1$, $\lambda 2$, $\lambda 3$ and $\lambda 4$ are incident upon the predetermined incident cores 4 as shown in FIG. 3. These incident light rays propagate through the incident cores 4 and further the slab-like core 6, strike on the diffraction grating 7 and each light ray is reflected by the same at an angle specified by the wavelength thereof. In this respect, if the diffraction grating 7 is so designed that these reflected light rays having wavelength of $\lambda 1$, $\lambda 2$, $\lambda 3$ and $\lambda 4$ are incident upon the corresponding four outgoing cores 5, the optical multiplexer-demultiplexer can serve as an optical demultiplexer so that the four kinds of light rays having different wavelengths reflected by the diffraction grating 7 are demultiplexed into groups each having a specific wavelength, they are thus incident upon the outgoing cores 5 having the corresponding wavelengths $\lambda 1$, $\lambda 2$, $\lambda 3$ and $\lambda 4$ and are externally outputted through the four corresponding outgoing cores 5.

In this embodiment, the width of the outgoing core 5 is greater than that of the incident core 4 and more specifically, the width of each incident core 4 is 7 μm and that of each outgoing core 5 is 30 μm.

In this embodiment, an incident core 8 and an outgoing core 9 for the alignment of the diffraction grating 7 are formed in addition to the incident cores 4 and the outgoing cores 5. They are used for accurately arranging the diffraction grating 7 at a predetermined position. Light rays having a wavelength of $\lambda 5$ are incident upon the incident core 8 for alignment, followed by receiving the light rays reflected by the diffraction grating 7 on the outgoing core 9 for alignment, determining the intensity of the light rays outputted from the outgoing core 9 and then adjusting the position of the diffraction grating 7 so that the intensity of the light rays is maximized to thus position the grating 7.

In this respect, the wavelength $\lambda 5$ herein used may be either of $\lambda 1$ to $\lambda 4$. It is also possible to use either of the incident cores 4 as both the incident core 8 for alignment and the incident core 4 upon which either of light rays having wavelength of $\lambda 1$, $\lambda 2$, $\lambda 3$ and $\lambda 4$ is incident, when using a wavelength other than $\lambda 1$ to $\lambda 4$ as $\lambda 5$. When using an optical waveguide having a structure according to the present invention, light rays can be outputted from a specific outgoing core 5 corresponding to $\lambda 1$ to $\lambda 4$, even if the wavelengths $\lambda 1$ to $\lambda 4$ of the incident light rays vary within predetermined wavelength ranges, respectively.

In this embodiment, there has been described an optical waveguide which can cope with four different wavelengths, but the embodiment can likewise cope with the number of wavelengths other than four different wavelengths by changing the numbers of the incident core 4 and the outgoing cores 5 in proportion to the number of wavelengths used.

EXAMPLE 2

Figure 4:
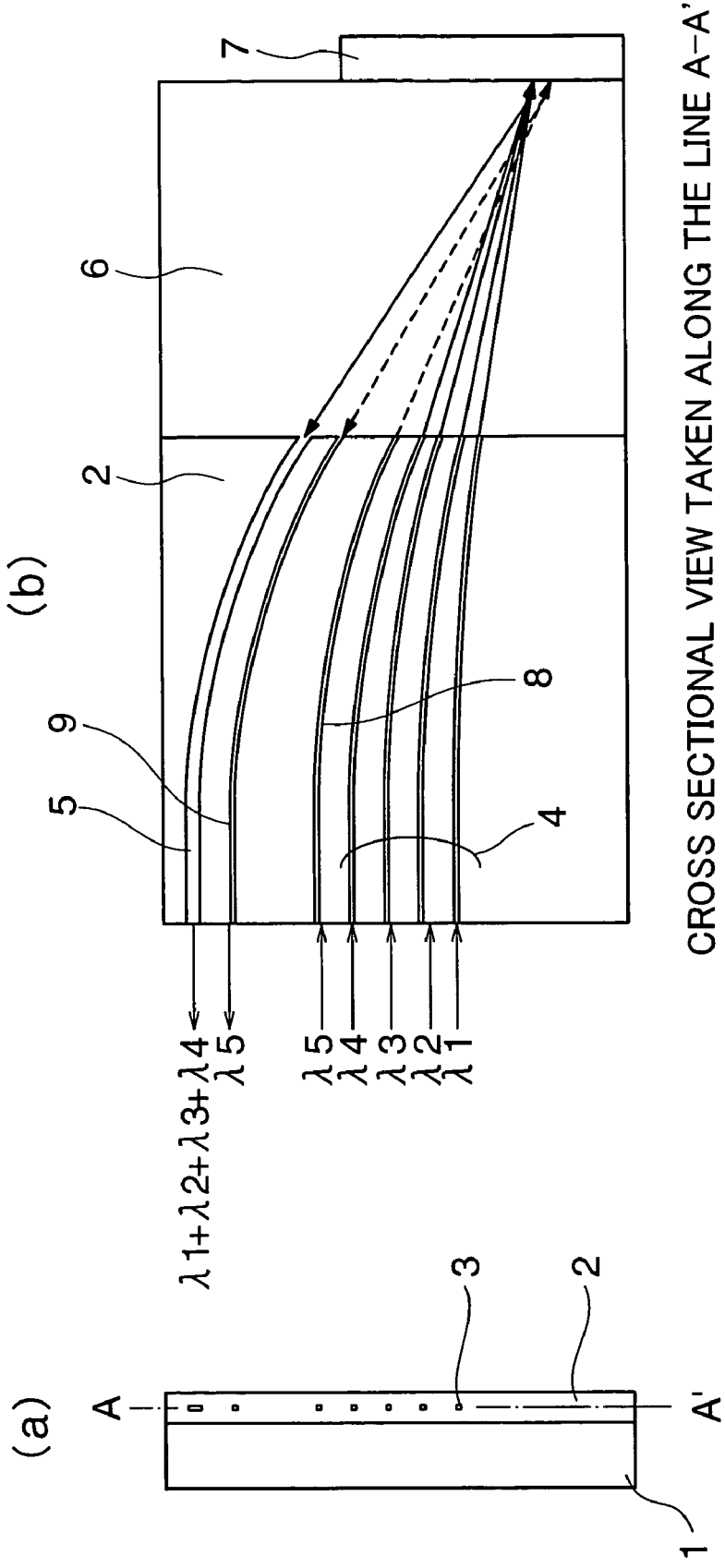
FIG. 4(*a*) is a schematic side view of an optical multiplexer-demultiplexer described in Example 2 according to the present invention and FIG. 4(*b*) is a cross sectional view thereof taken along the line A-A' in FIG. 4(*a*).
Figure 5:
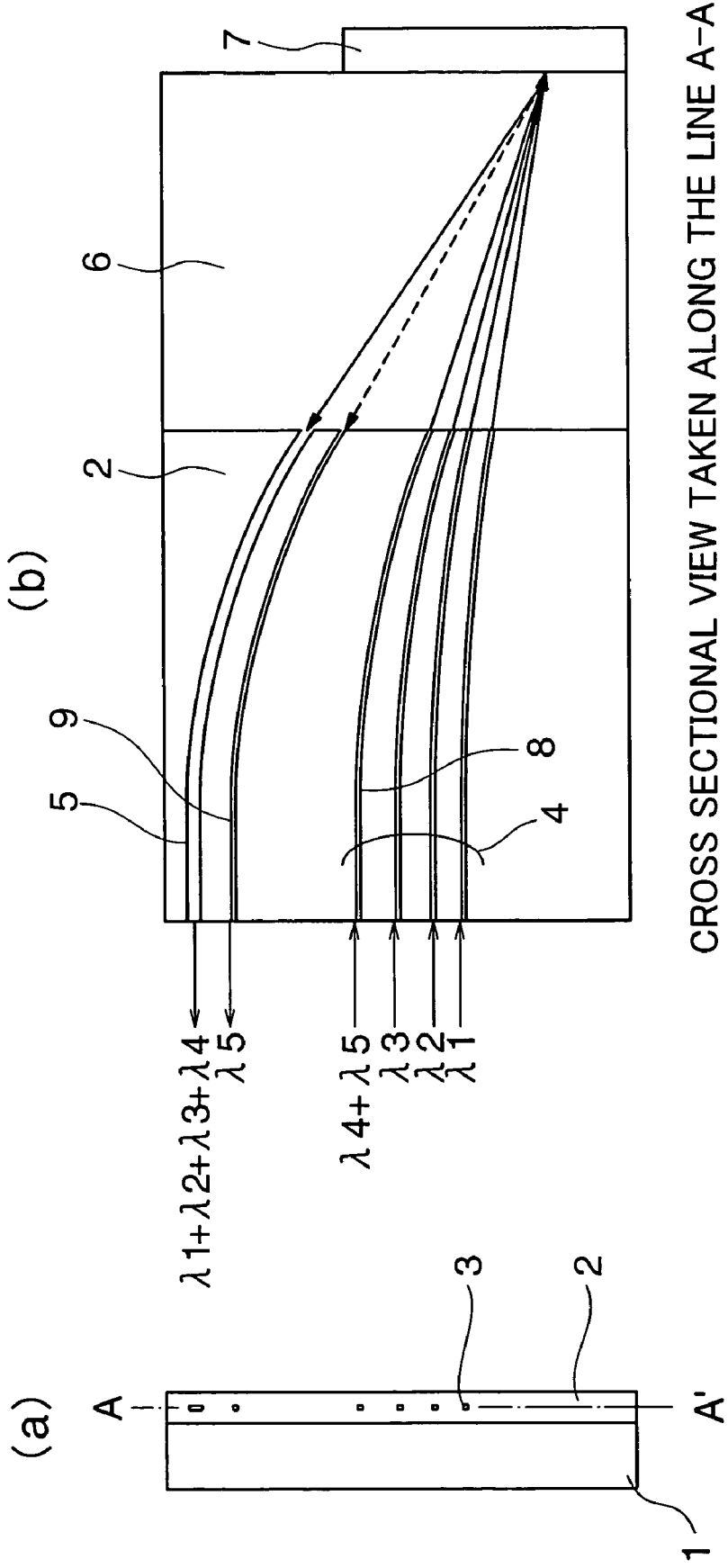
FIG. 5(*a*) is a schematic side view of an optical multiplexer-demultiplexer described in Example 2 according to the present invention and FIG. 5(*b*) is a cross sectional view thereof taken along the line A-A' in FIG. 5(*a*).

A second embodiment of the optical waveguide according to the present invention will hereunder be described with reference to FIG. 4. In this respect, FIG. 4(a) is a side view of an optical waveguide according to the present invention and FIG. 4(b) is a cross sectional view thereof taken along the line A-A' in FIG. 4(a). A core 3 having a rectangular cross section is embedded in a cladding 2 positioned on a substrate 1; the core 3 has a pattern comprising four incident cores 4, one outgoing core 5, an incident core 8 and an outgoing core 9 for alignment and a slab-like core 6; and a diffraction grating 7 is arranged at the right edge of the optical waveguide. In this connection, materials for preparing the substrate used herein may, for instance, be a glass, a semiconductor (Si or the like) or a polymeric resin. On the other hand, those for preparing the cladding 2 and the core 3 may be, for instance, $SiO_2$, or $SiO_2$ which comprises at least one additive for controlling the refractive index of these cladding and core such as Ge, Ti and F, or a polymeric material such as a fluorinated polyimide, a silicone resin or an epoxy resin whose refractive index is adjusted.

The diffraction grating 7 is provided, on the surface, with unevenness having a desired period and a metal such as Au or Al is coated on the surface thereof, which comes in contact with the optical waveguide, in order to reflect light rays.

The optical waveguide of the present invention having the foregoing structure can be used as an optical multiplexer. Four kinds of light rays having wavelengths of $\lambda 1$, $\lambda 2$, $\lambda 3$ and $\lambda 4$ are incident upon the four incident cores 4, respectively as shown in FIG. 4. The incident light rays propagate through the incident cores 4 and the slab-like core 6, they strike on the diffraction grating 7, each light ray is reflected by the same at an angle specified by the wavelength thereof, the light rays having wavelengths of $\lambda 1$, $\lambda 2$, $\lambda 3$ and $\lambda 4$ are incident upon a predetermined single outgoing core 5 and the four kinds of light rays reflected by the diffraction grating 7 are externally outputted through the single outgoing core 5. Thus, the resulting optical waveguide can operate as an optical multiplexer.

In this respect, the width of the outgoing core 5 is greater than that of the incident core 4 and more specifically, the width of each incident core 4 is 7 μm and that of the outgoing core 5 is 30 μm.

In this embodiment, an incident core 8 and an outgoing core 9 for the alignment of the diffraction grating 7 are formed in addition to the incident cores 4 and the outgoing cores 5. They are used for accurately arranging the diffraction grating 7 at a predetermined position. Light rays having a wavelength of $\lambda 5$ are incident upon the incident core 8 for alignment, followed by receiving the light rays reflected by the diffraction grating 7 on the outgoing core 9 for alignment, determining the intensity of the light rays outputted from the outgoing core 9 and then adjusting the position of the diffraction grating 7 so that the intensity of the light rays is maximized to thus align the grating 7. In this respect, the wavelength $\lambda 5$ herein used may be either of $\lambda 1$ to $\lambda 4$.

Alternatively, it is also possible to use either of the incident cores 4 as both the incident core 8 for alignment and the incident core 4 upon which either of light rays having wavelength of $\lambda 1$, $\lambda 2$, $\lambda 3$ and $\lambda 4$ is incident, when using a wavelength other than $\lambda 1$ to $\lambda 4$ as $\lambda 5$. When using an optical waveguide having the structure according to the present invention, light rays having wavelengths $\lambda 1$ to $\lambda 4$ can be outputted from the outgoing core 5, even if the wavelengths $\lambda 1$ to $\lambda 4$ of the incident light rays vary within predetermined wavelength ranges, respectively.

In this embodiment, there has been described an optical waveguide which can cope with four different wavelengths, but the embodiment can likewise cope with the number of wavelengths other than four different wavelengths by changing the numbers of the incident core 4 and the outgoing cores 5 in proportion to the number of wavelengths used.

EXAMPLE 3

Figure 6:
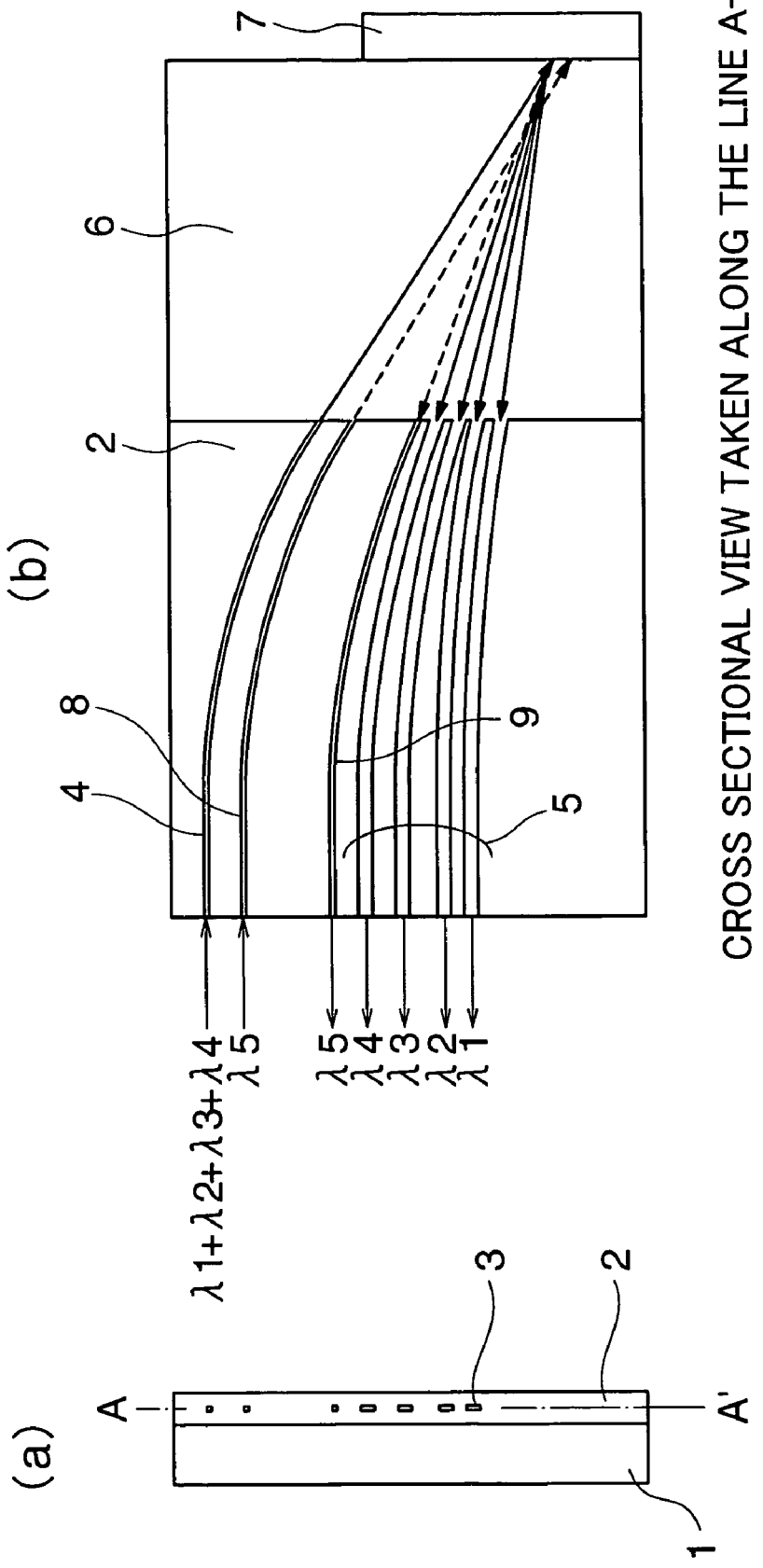
FIG. 6(*a*) is a schematic side view of an optical multiplexer-demultiplexer described in Example 3 according to the present invention and FIG. 6(*b*) is a cross sectional view thereof taken along the line A-A' in FIG. 6(*a*).

A third embodiment of the optical waveguide according to the present invention will hereunder be described with reference to FIG. 6. In this respect, FIG. 6(a) is a schematic side view of an optical waveguide according to the present invention and FIG. 6(b) is a cross sectional view thereof taken along the line A-A' in FIG. 6(a). A core 3 having a rectangular cross section is embedded in a cladding 2 positioned on a substrate 1; the core 3 has a pattern comprising one incident core 4, four outgoing cores 5, an incident core 8 and an outgoing core 9 for alignment and a slab-like core 6; and a diffraction grating 7 is arranged at the right edge of the optical waveguide. In this connection, materials for preparing the substrate 1 used herein may, for instance, be a glass, a semiconductor (Si or the like) or a polymeric resin. On the other hand, those for preparing the cladding 2 and the core 3 may be, for instance, $SiO_2$, or $SiO_2$ which comprises at least one additive for controlling the refractive index of these cladding and core such as Ge, Ti and F, or a polymeric material such as a fluorinated polyimide, a silicone resin or an epoxy resin whose refractive index is adjusted.

The diffraction grating 7 is provided, on the surface, with unevenness having a desired period and a metal such as Au or Al is coated on the surface thereof, which comes in contact with the optical waveguide, in order to reflect light rays. The optical waveguide of the present invention having the foregoing structure can be used as an optical demultiplexer. In case where the multiplexer-demultiplexer is used as a demultiplexer, four kinds of wavelength-multiplexed optical signals having wavelengths of $\lambda 1$, $\lambda 2$, $\lambda 3$ and $\lambda 4$ are incident upon a predetermined incident core 4 as shown in FIG. 6. The incident light rays propagate through the incident core 4 and the slab-like core 6, they strike on the diffraction grating 7, each light ray is reflected by the same at an angle specified by the wavelength thereof, the light rays are divided into groups each having a wavelength of $\lambda 1$, $\lambda 2$, $\lambda 3$ or $\lambda 4$, each of them is incident upon either of the corresponding outgoing cores 5 and the four kinds of light rays reflected by the diffraction grating 7 are externally outputted through the four outgoing cores 5. Thus, the resulting optical waveguide can operate as an optical demultiplexer.

In this respect, the width of the outgoing core 5 is greater than that of the incident core 4 and more specifically, the width of the incident core 4 is 7 μm and that of each outgoing core 5 is 30 μm.

In this embodiment, an incident core 8 and an outgoing core 9 for the alignment of the diffraction grating 7 are formed in addition to the incident core 4 and the outgoing cores 5. They are used for accurately arranging the diffraction grating 7 at a predetermined position. Light rays having a wavelength of $\lambda 5$ are incident upon the incident core 8 for alignment, followed by receiving the light rays reflected by the diffraction grating 7 on the outgoing core 9 for alignment, determining the intensity of the light rays outputted from the outgoing core 9 and then adjusting the position of the diffraction grating 7 so that the intensity of the light rays is maximized to thus align the diffraction grating 7.

Figure 7:
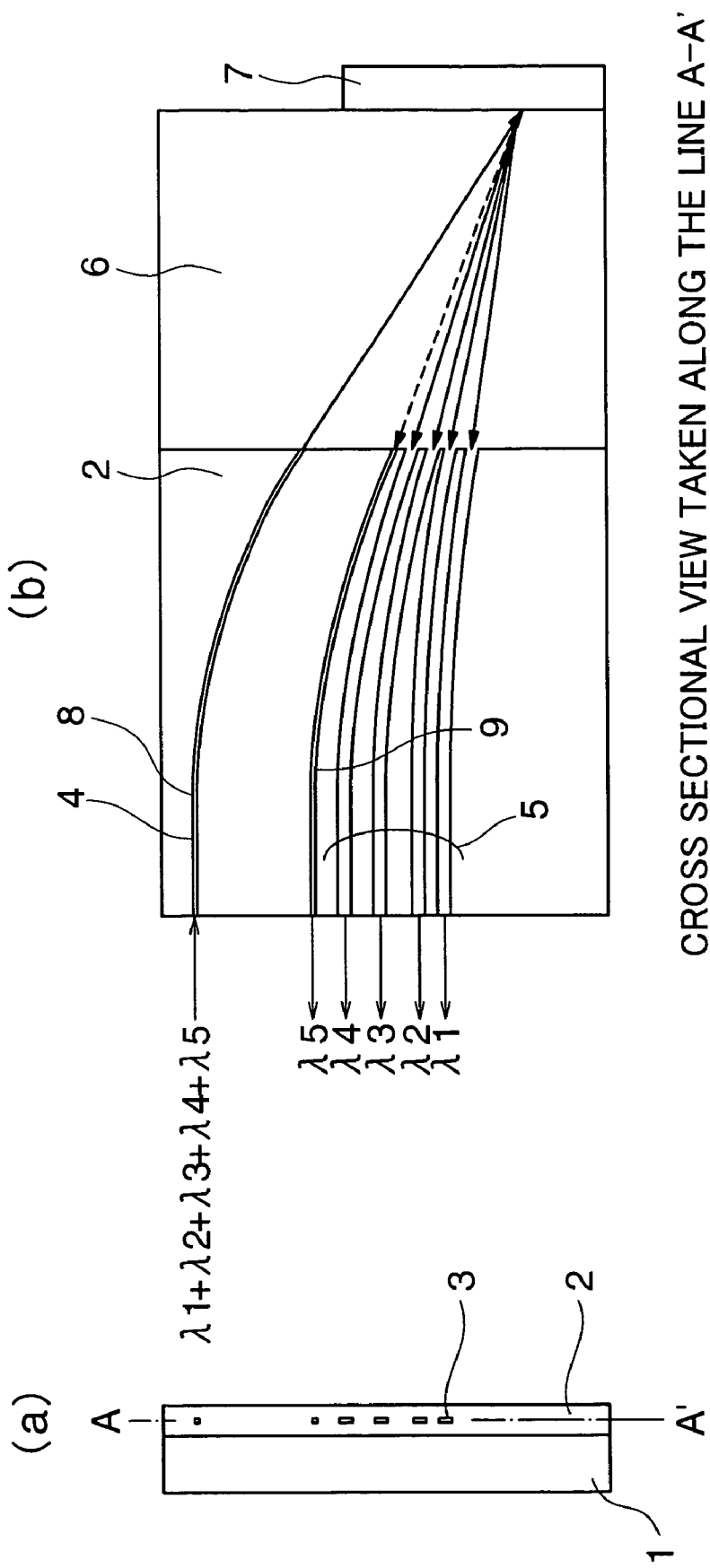
FIG. 7(*a*) is a schematic side view of an optical multiplexer-demultiplexer described in Example 3 according to the present invention and FIG. 7(*b*) is a cross sectional view thereof taken along the line A-A' in FIG. 7(*a*).

In this respect, the wavelength $\lambda 5$ herein used may be either of $\lambda 1$ to $\lambda 4$. Alternatively, as shown in FIG. 7, it is also possible to use the incident core 4 as both the incident core 8 for alignment and the incident core 4 upon which light rays having wavelengths of $\lambda 1$, $\lambda 2$, $\lambda 3$ and $\lambda 4$ are incident, when using a wavelength other than $\lambda 1$ to $\lambda 4$ as $\lambda 5$. When using an optical waveguide having the structure according to this embodiment of the present invention, light rays having wavelengths $\lambda 1$ to $\lambda 4$ can be outputted from the outgoing cores 5, even if the wavelengths $\lambda 1$ to $\lambda 4$ of the incident light rays vary within predetermined wavelength ranges, respectively.

In this embodiment, there has been described an optical waveguide which can cope with four different wavelengths, but the embodiment can likewise cope with the number of wavelengths other than four different wavelengths by changing the numbers of the incident core 4 and the outgoing cores 5 in proportion to the number of wavelengths used.

EXAMPLE 4

Figure 8:
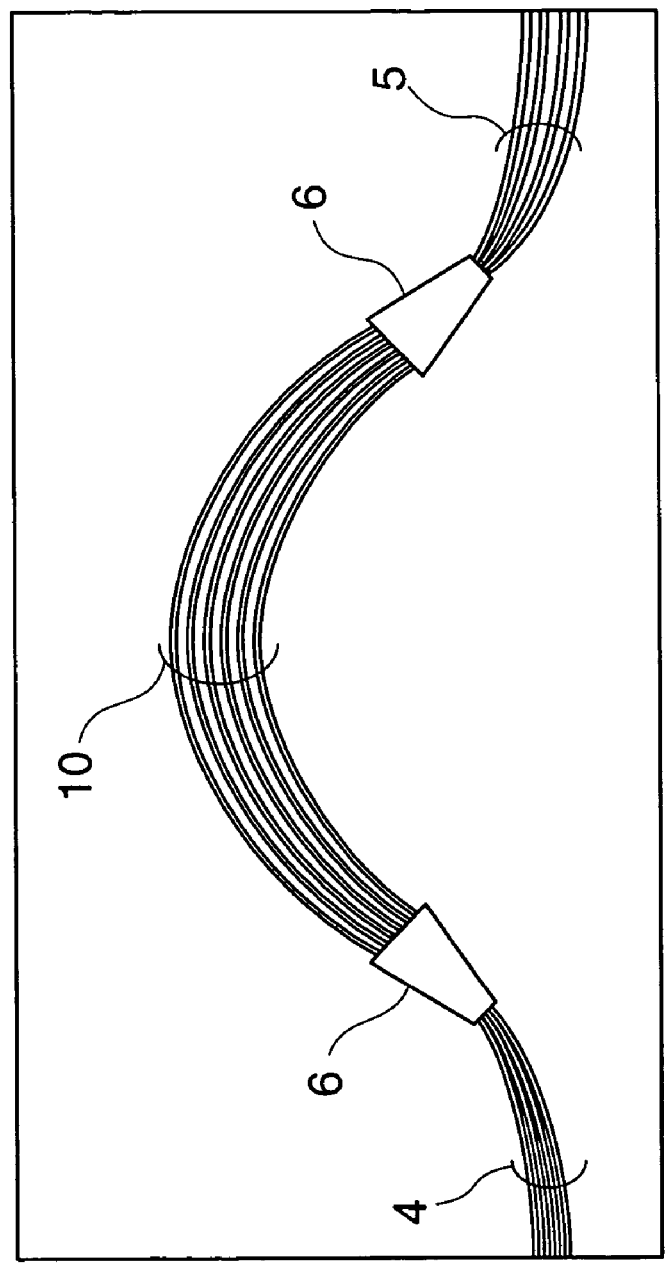
FIG. 8(*a*) is a schematic side view of an optical multiplexer-demultiplexer described in Example 4 according to the present invention and FIG. 8(*b*) is a cross sectional view thereof taken along the line A-A' in FIG. 8(*a*).

A fourth embodiment of the optical waveguide according to the present invention will hereunder be described with reference to FIG. 8 which is a block diagram showing an optical waveguide of the present invention. As shown in FIG. 8(a), the optical waveguide has such a structure that a core 3 having a rectangular cross section is embedded in a cladding 2 positioned on a substrate 1. Moreover, as shown in FIG. 8(b), the core 3 has a pattern comprising four incident cores 4, four outgoing cores 5 having a width greater than that of the incident core 4, a slab-like core 6 and an array-like core 10. This structure is one referred to as an array type optical waveguide-diffraction grating. The optical waveguide having the structure according to this embodiment of the invention can operate as a multiplexer-demultiplexer. When using the optical waveguide as a multiplexer, four kinds of optical signals having wavelengths of $\lambda 1$, $\lambda 2$, $\lambda 3$ and $\lambda 4$ are incident upon the corresponding incident cores 4. The incident light rays propagate through the incident cores 4 and incident upon the slab-like core 6, they further propagate through the array-like core 10 and the slab-like core 6 and they are then incident upon one of the four outgoing cores 5. At this stage, the four kinds of light rays having wavelengths of $\lambda 1$, $\lambda 2$, $\lambda 3$ and $\lambda 4$ are multiplexed by making these light rays incident upon one outgoing core 5 and the resulting multiplexed light is outputted from the core 5 after the propagation thereof through the core 5.

On the other hand, when using the optical waveguide as a demultiplexer, four kinds of wavelength-multiplexed optical signals having wavelengths of $\lambda 1$, $\lambda 2$, $\lambda 3$ and $\lambda 4$ are incident upon one of the four incident cores 4. The light rays incident upon the same propagate through the incident core 4, they are incident upon the slab-like core 6, they further propagate through the array-like core 10 and the slab-like core 6 and they are then incident upon one of the outgoing cores 5. At this stage, the light rays are divided into groups each having a wavelength of $\lambda 1$, $\lambda 2$, $\lambda 3$ or $\lambda 4$, each of them is incident upon either of the corresponding outgoing cores 5 and they are externally outputted through the four outgoing cores 5 after the propagation through the core. In this respect, materials for preparing the substrate used herein may, for instance, be a glass, a semiconductor (Si or the like) or a polymeric resin. On the other hand, those for preparing the cladding 2 and the core 3 may be, for instance, $SiO_2$, or $SiO_2$ which comprises at least one additive for controlling the refractive index of these cladding and core such as Ge, Ti and F, or a polymeric material such as a fluorinated polyimide, a silicone resin or an epoxy resin, whose refractive index is adjusted.

In this respect, the width of the outgoing core 5 is greater than that of the incident core 4 and more specifically, the width of each incident core 4 is 7 μm and that of each outgoing core 5 is 30 μm. When using an optical waveguide having the structure according to this embodiment of the present invention, light rays having wavelengths $\lambda 1$ to $\lambda 4$ can operate as an optical multiplexer-demultiplexer, even if the wavelengths $\lambda 1$ to $\lambda 4$ of the incident light rays vary within predetermined wavelength ranges, respectively.

In this embodiment, there has been described an optical waveguide which can cope with four different wavelengths, but the embodiment can likewise cope with the number of wavelengths other than four different wavelengths by changing the numbers of the incident core 4 and the outgoing cores 5 in proportion to the number of wavelengths used.

Next, an example of the second embodiment according to the present invention will be described below with reference to FIGS. 10 and 11. FIG. 10(a) is a block diagram showing an example of the optical multiplexer-demultiplexer according to the present invention, FIG. 10(b) is a cross sectional view thereof taken along the line A-A' in FIG. 10(a) and FIG. 10(c) is a cross sectional view thereof taken along the line B-B' in FIG. 10(a). The device as shown in FIG. 10 is an example which makes use of a reflection type diffraction grating 4, but the present invention is likewise effective when using a transmission type diffraction grating.

As a material for preparing the core layer 2 of this optical waveguide, there may be used, for instance, an acrylic resin, $SiO_2$, or $SiO_2$ which comprises at least one additive for controlling the refractive index of the same such as Ge, Ti and F to control the birefringence index of the core layer 2 to a level of not more than 0.007.

Alternatively, the birefringence index thereof can likewise be controlled to not more than 0.007 by the use of a substrate 5 made of a resin such as a polyimide even when using such a core layer 2 for the optical waveguide prepared from a material having a high birefringence index such as a fluorinated polyimide.

Figure 10:
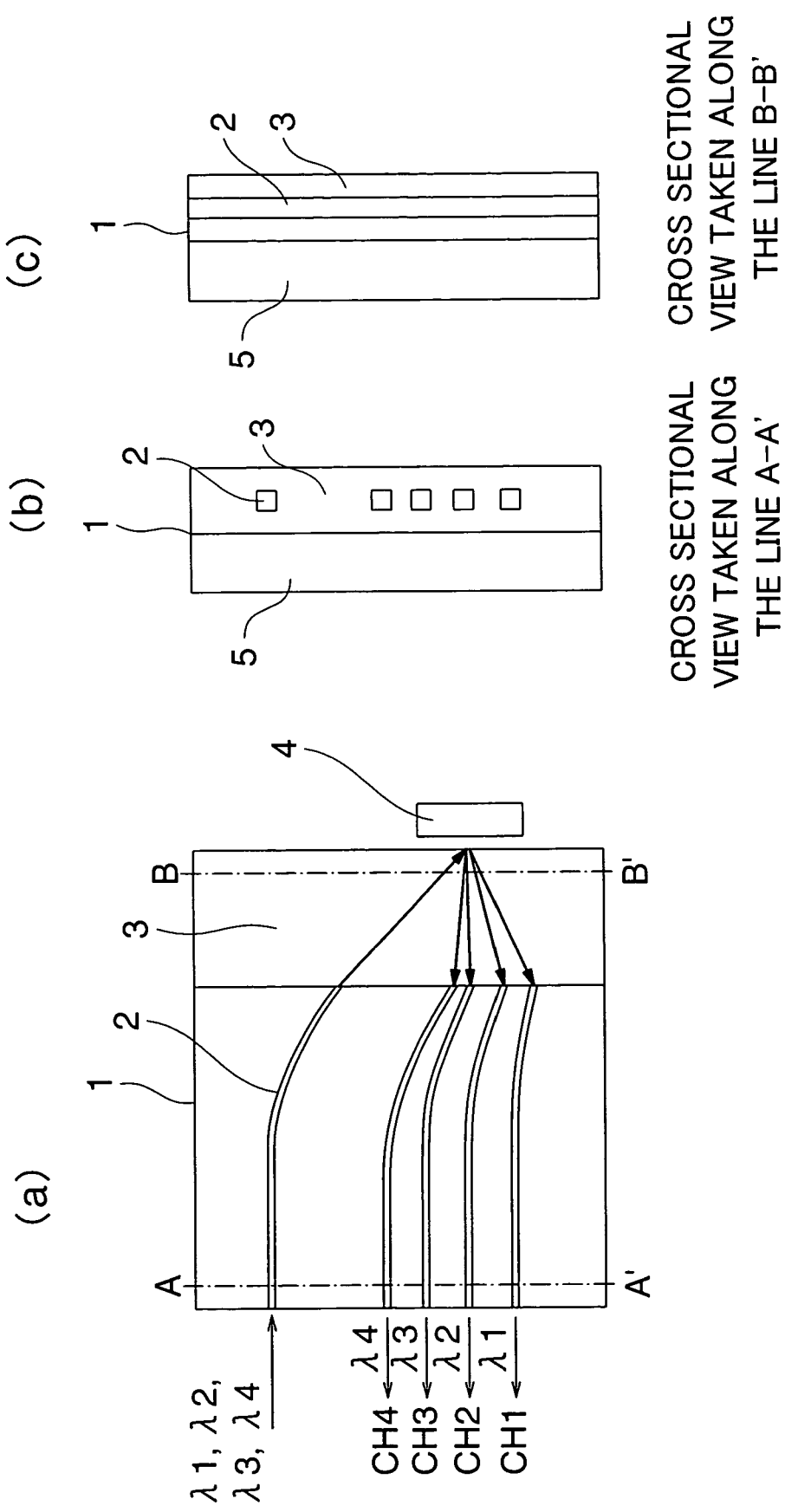
FIG. 10(*a*) is a block diagram showing an optical multiplexer-demultiplexer according to an embodiment of the present invention, FIG. 10(*b*) is a cross sectional view thereof taken along the line A-A' in FIG. 10(*a*) and FIG. 10(*c*) is a cross sectional view thereof taken along the line B-B' in FIG. 10(*a*).
Figure 11:
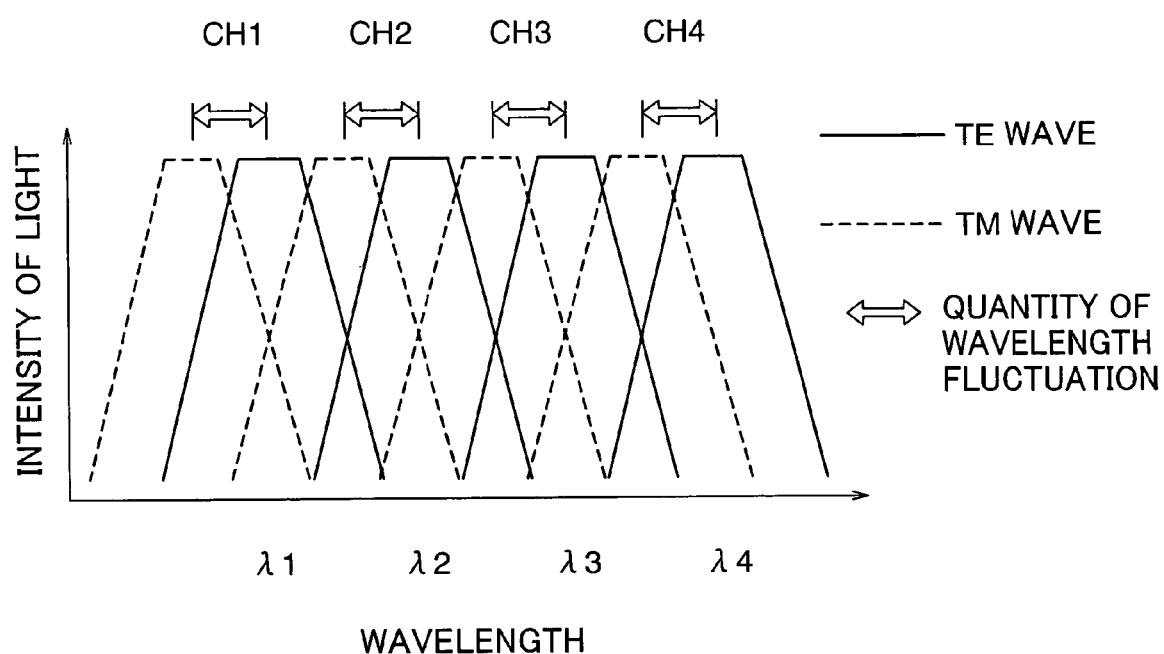
FIG. 11 is a diagram showing the optical demultiplexing characteristics observed for the optical multiplexer-demultiplexer shown in FIG. 10.

FIG. 11 is a diagram showing the fact that a multiplexed incident signal light is demultiplexed into a plurality of light rays by the action of the diffraction grating and then they are outputted through ports CH1 to CH4 or showing the optical demultiplexing characteristics observed for the optical multiplexer-demultiplexer shown in FIG. 10. Such an embodiment having the foregoing structure would permit the control of the birefringence index of the layer to not more than 0.007 and the control of the wavelength fluctuation of the outputted signal light as shown in FIG. 11 to a level of not more than 5 nm.

EXAMPLE 5

The relation between the birefringence index of the core layer of an optical waveguide and the wavelength fluctuation can be explained on the basis of the foregoing equation (1). According to the equation (1), any occurrence of wavelength fluctuation can be suppressed by the reduction of the birefringence index of the core layer of an optical waveguide. When a film of poly(methyl methacrylate) serving as a core layer for an optical waveguide was formed on an Si substrate, the birefringence index of the resulting film was found to be not more than 0.001 at a wavelength of 1300 nm. Accordingly, an optical multiplexer-demultiplexer can be obtained by combining an optical waveguide which is prepared by forming, on an Si substrate, a core layer for an optical waveguide using this poly(methyl methacrylate) and a cladding layer therefor using a poly(fluoroalkyl methacrylate) whose refractive index is adjusted by the fluorination thereof, with a diffraction grating prepared using quartz as a basic material and the wavelength fluctuation of the device can thus be controlled to a level of not more than 1 nm.

COMPARATIVE EXAMPLE 1

An optical multiplexer-demultiplexer was prepared by combining an optical waveguide (the birefringence index of the core layer thereof was 0.009 at a wavelength of 1300 nm) which was prepared by forming, on an Si substrate, a core layer for an optical waveguide using OPI-N3265 (a fluorinated polyimide resin available from Hitachi Chemical Co., Ltd.) and a cladding layer therefor using OPI-N3115 (a fluorinated polyimide resin available from Hitachi Chemical Co., Ltd.), with a diffraction grating prepared using quartz as a basic material, followed by the determination of the relation between the polarization direction and the optical demultiplexing characteristics of the resulting optical multiplexer-demultiplexer. In this case, the optical demultiplexing characteristics of the resulting device underwent a change depending on whether the signal light incident upon the optical waveguide was TE-polarized or TM-polarized one and this resulted in the generation of a wavelength fluctuation of 8 nm. This wavelength fluctuation is in good agreement with the value determined by the foregoing equation (1).

INDUSTRIAL APPLICABILITY

The present invention permits the preparation of an optical waveguide used in an optical multiplexer-demultiplexer which can multiplex or demultiplex a plurality of light rays having different wavelengths each of which undergoes a change within a predetermined range. Moreover, the present invention also permits the preparation of an optical multiplexer-demultiplexer which can be used in the wavelength division multiplexing communication and more specifically, an optical multiplexer-demultiplexer in which the birefringence index of the core layer of the optical waveguide is controlled to a level of not more than 0.007 to thus control the wavelength fluctuation of the outputted signal light dependent on the polarization direction of the incident signal light to not more than 5 nm.

What is claimed is:
1. An optical multiplexer-demultiplexer comprising:
   (a) an optical waveguide; and
   (b) an alignable diffraction grating, wherein the alignable diffraction grating is movable independently of the optical waveguide, and wherein said optical waveguide comprises
      i. at least one core for alignment of the alignable diffraction grating;
      ii. a core for incident light; and
      iii. a plurality of cores for outgoing light, wherein a width of the cores for outgoing light is more than 1.5 times a width of the core for incident light; and
   wherein the alignable diffraction grating comprises
      i. a surface provided with unevenness having a predetermined period; and
      ii. a metal coated on the surface, wherein the alignable diffraction grating is disposed so the metal coated on the surface contacts said optical waveguide in order to reflect light rays.

2. The optical multiplexer-demultiplexer of claim 1, wherein the width of the core for outgoing light is 2 to 20 times that of the core for incident light.

3. The optical multiplexer-demultiplexer of claim 2, wherein the absolute value of the difference between the refractive index (nTE) of the core layer of the optical waveguide in the direction parallel to the plane of the film and that (nTM) of the core layer thereof in the direction perpendicular to the plane of the film is not more than 0.007 at the wavelength used.

4. The optical multiplexer-demultiplexer as set forth in claim 3, wherein the optical waveguide and a substrate supporting the waveguide are made of resins.

5. The optical multiplexer-demultiplexer as set forth in claim 2, wherein the optical waveguide and a substrate supporting the waveguide are made of resins.

6. The optical multiplexer-demultiplexer of claim 1, wherein the width of the core for incident light ranges from 3 to 10 μm and that of the core for outgoing light ranges from 15 to 50 μm.

7. The optical multiplexer-demultiplexer of claim 6, comprising at least two incident cores, wherein either of the incident cores is used as the incident core for alignment.

8. The optical multiplexer-demultiplexer as set forth in claim 7, wherein the optical waveguide and a substrate supporting the waveguide are made of resins.

9. The optical multiplexer-demultiplexer of claim 1, wherein the light propagating through the core for incident light is single mode one.

10. The optical multiplexer-demultiplexer of claim 9, wherein the optical waveguide and a substrate supporting the optical waveguide are made of resins.

11. The optical multiplexer-demultiplexer of claim 1, wherein the absolute value of the difference between the refractive index (nTE) of the core layer of the optical waveguide in the direction parallel to the plane of the film and that (nTM) of the core layer thereof in the direction perpendicular to the plane of the film is not more than 0.007 at the wavelength used.

12. The optical multiplexer-demultiplexer as set forth in claim 11, wherein the optical waveguide and a substrate supporting the waveguide are made of resins.

13. The optical multiplexer-demultiplexer of claim 1, wherein the optical waveguide and the substrate supporting the waveguide are made of resins.

14. The optical multiplexer-demultiplexer of claim 1, wherein the core for alignment of the alignable diffraction grating optimizes a position of the alignable diffraction grating in such a manner that intensity of the light outputted through the core for alignment is maximized when diffracted light from the alignable diffraction grating is incident upon the core for alignment.

15. The optical multiplexer-demultiplexer of claim 14, wherein the optical waveguide and a substrate supporting the optical waveguide are made of resins.

16. The optical multiplexer-demultiplexer of claim 1, wherein the core for alignment of the alignable diffraction grating comprises an incident core for alignment and an outgoing core for alignment, and said incident core and said outgoing core are used for accurately arranging the alignable diffraction grating at a predetermined position in such a manner that light rays are incident upon the incident core for alignment, followed by receiving light rays reflected by the alignable diffraction grating on the outgoing core for alignment, determining intensity of light rays outputted from the outgoing core and then adjusting position of the alignable diffraction grating so that the intensity of light rays outputted from the outgoing core is maximized to position the alignable diffraction grating.

17. The optical multiplexer-demultiplexer of claim 16, comprising at least two incident cores, wherein either of the incident cores is used as the incident core for alignment.

18. The optical multiplexer-demultiplexer of claim 17, wherein the optical waveguide and a substrate supporting the optical waveguide are made of resins.

19. The optical multiplexer-demultiplexer of claim 16, wherein the optical waveguide and a substrate supporting the optical waveguide are made of resins.

* * * * *